US008074753B2

(12) United States Patent
Tahara et al.

(10) Patent No.: US 8,074,753 B2
(45) Date of Patent: Dec. 13, 2011

(54) DRIVE DEVICE OF VEHICLE

(75) Inventors: Yasuaki Tahara, Nagoya (JP); Yasuhiro Endo, Okazaki (JP); Kazutaka Tatematsu, Nagoya (JP)

(73) Assignee: Toyota Jidosha Kabushiki Kaisha, Aichi-Ken (JP)

( * ) Notice: Subject to any disclaimer, the term of this patent is extended or adjusted under 35 U.S.C. 154(b) by 901 days.

(21) Appl. No.: 12/091,673

(22) PCT Filed: Oct. 25, 2006

(86) PCT No.: PCT/JP2006/321814
§ 371 (c)(1),
(2), (4) Date: Apr. 25, 2008

(87) PCT Pub. No.: WO2007/049799
PCT Pub. Date: May 3, 2007

(65) Prior Publication Data
US 2009/0114462 A1 May 7, 2009

(30) Foreign Application Priority Data
Oct. 26, 2005 (JP) .................... 2005-311408

(51) Int. Cl.
B60K 11/02 (2006.01)
(52) U.S. Cl. .................................... 180/65.21; 903/904
(58) Field of Classification Search .................. 903/904, 903/952
See application file for complete search history.

(56) References Cited

U.S. PATENT DOCUMENTS

| 3,529,698 | A | * | 9/1970 | Nelson | 184/6.12 |
| 4,240,524 | A | * | 12/1980 | Katayama et al. | 184/6.12 |
| 5,495,906 | A | * | 3/1996 | Furutani | 180/65.23 |
| 5,929,595 | A | | 7/1999 | Lyons et al. | |
| 6,059,064 | A | * | 5/2000 | Nagano et al. | 180/243 |
| 6,166,498 | A | * | 12/2000 | Yamaguchi et al. | 318/34 |
| 6,198,183 | B1 | | 3/2001 | Baeumel et al. | |
| 6,321,865 | B1 | * | 11/2001 | Kuribayashi et al. | 180/243 |
| 6,419,040 | B2 | * | 7/2002 | Kitano et al. | 180/243 |

(Continued)

FOREIGN PATENT DOCUMENTS

CN 1663837 A 9/2005

(Continued)

OTHER PUBLICATIONS

Chinese Office Action for corresponding Chinese Patent Application No. 200680040166.X issued Aug. 26, 2010.

Primary Examiner — J. Allen Shriver, II
Assistant Examiner — James Triggs
(74) Attorney, Agent, or Firm — Sughrue Mion, PLLC

(57) ABSTRACT

A drive device of a vehicle includes a motor generator, a lubricant circulating mechanism lubricating and cooling the motor generator, a power control unit controlling the motor generator, arranged on a circulation path of a lubricating oil and being in contact with the lubricating oil for transferring and receiving a heat to and from the lubricating oil, and a casing accommodating the motor generator, the lubricating mechanism and the power control mechanism, and provided with the circulation path. Preferably, the power control unit includes a power control element and a board (120) having a first main surface on which the power control element is mounted. The board (120) is provided on its second main surface side with a radiator fin (390, 392 and 394) for contact with the lubricating oil in the circulation path.

6 Claims, 15 Drawing Sheets

U.S. PATENT DOCUMENTS

| | | | |
|---|---|---|---|
| 6,513,609 B2 * | 2/2003 | Hasegawa | 180/65.6 |
| 6,540,636 B2 * | 4/2003 | Amanuma et al. | 475/149 |
| 7,800,260 B2 * | 9/2010 | Komatsu et al. | 310/54 |
| 2002/0139592 A1 * | 10/2002 | Fukasaku et al. | 180/65.2 |
| 2003/0037976 A1 | 2/2003 | Bowen et al. | |
| 2004/0226761 A1 | 11/2004 | Takenaka et al. | |
| 2005/0063836 A1 | 3/2005 | Kimura et al. | |
| 2005/0211490 A1 | 9/2005 | Shimizu et al. | |

FOREIGN PATENT DOCUMENTS

| | | |
|---|---|---|
| EP | 1 049 235 A2 | 11/2000 |
| JP | 11-346454 A | 12/1999 |
| JP | 2000-152545 A | 5/2000 |
| JP | 2001-119961 A | 4/2001 |
| JP | 2002-314280 A | 10/2002 |
| JP | 2003-199293 A | 7/2003 |
| JP | 2004-201409 A | 7/2004 |
| JP | 2004-251161 A | 9/2004 |
| JP | 2004-343845 A | 12/2004 |
| JP | 2005-64131 A | 3/2005 |
| JP | 2005-117790 A | 4/2005 |
| JP | 2005-253167 A | 9/2005 |
| RU | 2 144 869 C1 | 1/2000 |
| RU | 2 221 161 C2 | 1/2004 |
| RU | 2 223 183 C2 | 2/2004 |

* cited by examiner

DRIVE DEVICE OF VEHICLE

CROSS REFERENCE TO RELATED APPLICATIONS

This application is a National Stage of International Application No. PCT/JP2006/321814 filed on Oct. 25, 2006, claiming priority based on Japanese Patent Application No. 2005-311408, filed Oct. 26, 2005, the contents of all of which are incorporated herein by reference in their entirety.

TECHNICAL FIELD

The invention relates to a drive device, and particularly to a vehicle drive device accommodating an inverter and a motor in one casing.

BACKGROUND ART

Many of present hybrid cars have structures in which an inverter has a large box-like casing fixed to a chassis, and a motor casing (trans-axle) is arranged under the casing. Consideration may be given to the drive device of the hybrid vehicle that can be mounted in as many as types of hybrid vehicles. In this case, if the device employs two casings, an arrangement of such casings must be optimized for each of the vehicle types. Therefore, it is difficult to standardize parts.

In principle, it is desired that units combined with each other for the operation are integrated and accommodated in one casing. Japanese Patent Laying-Open Nos. 2004-343845, 2001-119961 and 2003-199293 have disclosed drive devices of hybrid vehicles each having a motor and an inverter integrated together.

However, in the drive devices of the hybrid vehicles disclosed in Japanese Patent Laying-Open Nos. 2004-343845 and 2001-119961, the inverter is merely arranged on the motor, and this structure is susceptible to improvement in connection with a vertical position of the center of mass of the vehicle equipped with the device. Further, consideration is not sufficiently given to reduction of a space required for mounting the drive device on the hybrid vehicle.

For allowing the mounting on many types of vehicles, it is desired that the inverter and the motor are arranged within substantially the same contours as an automatic transmission neighboring to an engine in an ordinary vehicle.

In Japanese Patent Laying-Open No. 2003-199293, a water-cooling system is employed as a cooling system of an inverter unit, and an oil-cooling system is employed as a cooling system of a motor unit so that the structure is complicated.

DISCLOSURE OF THE INVENTION

An object of the invention is to provide a vehicle drive device which includes an integrated converter and has a small and simple structure.

In summary, a drive device of a vehicle according to the invention includes a first rotating electric machine; a circulating mechanism for a lubricating oil lubricating and cooling the first rotating electric machine; a power control unit controlling the first rotating electric machine and cooled by heat exchange with the lubricating oil; and a casing accommodating the first rotating electric machine, the circulating mechanism and the power control unit, and provided with the circulation path.

Preferably, the power control unit includes a power control element, and a board having a first main surface on which the power control element is mounted. The board has a radiator projection arranged on a second main surface side of the board for contact with the lubricating oil in the circulation path.

Preferably, the casing includes an oil pan arranged in a downstream portion of the circulation path, and the circulating mechanism includes a mechanism drawing up the lubricating oil from the oil pan according to the rotation of the rotating electric machine and feeding the lubricating oil to a portion of the lubrication path upstream to the power control unit.

Preferably, the vehicle includes an internal combustion engine used together with the first rotating electric machine for rotating a wheel, and the casing is in contact with the internal combustion engine in a thermally conductive fashion.

Further preferably, a heat of the lubricating oil is transmitted to a housing of the internal combustion engine through the casing.

Further preferably, the housing of the internal combustion engine is provided with a water passage circulating cooling water, and the casing has a radiator projection projected into the water passage.

Preferably, the vehicle includes an internal combustion engine. The drive device of the vehicle further includes a second rotating electric machine including a rotor having a rotation axis coaxial with a rotation axis of a rotor of the first rotating electric machine; and a power splitting mechanism arranged coaxially with a rotation axis of a crank shaft of the internal combustion engine and between the first and second rotating electric machines, and having a first shaft receiving a rotation of the rotor of the first rotating electric machine, a second shaft receiving a rotation of the rotor of the second rotating electric machine and a third shaft receiving a rotation of the crank shaft. The power control unit controls the first and second rotating electric machines. The casing further accommodates the second rotating electric machine and the power splitting mechanism.

Further preferably, the power control unit includes first and second inverters arranged corresponding to the first and second rotating electric machines, respectively, and a voltage converter arranged commonly to the first and second inverters. The voltage converter includes a reactor and a capacitor arranged in a divided fashion and located on the opposite sides of one of the first and second rotating electric machine and the power splitting mechanism, respectively.

Further preferably, the casing includes a first accommodation chamber provided with a first opening and accommodating the power control unit, a second accommodation chamber provided with a second opening and accommodating the second rotating electric machine, and a partition separating the first and second accommodating chambers from each other. The partition is provided with a hole forming a part of the circulation path.

The invention can achieves the vehicle drive device that is integrated with an inverter and has a small and simple structure.

BEST MODES FOR CARRYING OUT THE INVENTION

Embodiments of the invention will now be described with reference to the drawings. The same or corresponding portions bear the same reference numbers, and description thereof is not repeated.

[Description of Vehicle Components]

Figure 1:
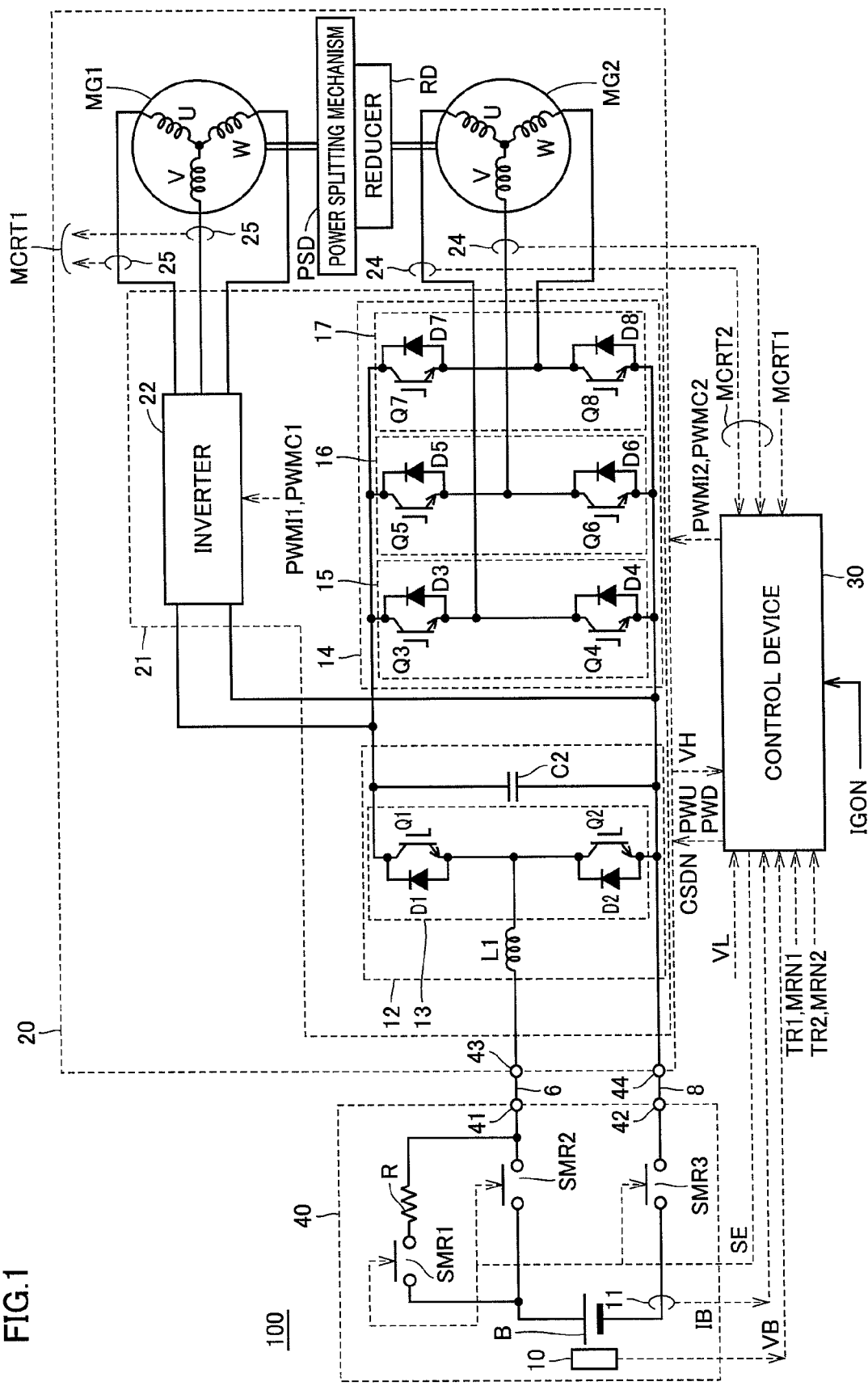
FIG. 1 is a circuit diagram showing a structure relating to motor generator control of a hybrid vehicle 100 according to an embodiment of the invention.

FIG. 1 is a circuit diagram showing a structure relating to a motor generator control of a hybrid vehicle 100 according to the embodiment of the invention.

Referring to FIG. 1, vehicle 100 includes a battery unit 40, a drive device 20 and a control device 30 as well as an engine and wheels that are not shown.

Drive device 20 includes motor generators MG1 and MG2, a power splitting mechanism PSD, a reducer RD and a power control unit 21 controlling motor generators MG1 and MG2.

Basically, power splitting mechanism PSD is connected to an engine 4 and motor generators MG1 and MG2 for distributing a power between engine 4 and motor generators MG1 and MG2. For example, a planetary gear mechanism having three rotation axes, i.e., a sun gear, a planetary gear and a ring gear may be used as the power splitting mechanism.

Two of the rotation axes of power splitting mechanism PSD are connected to the respective rotation axes of engine 4 and motor generator MG1, and the other one rotation axis is connected to reducer RD. Reducer RD that is integrated with power splitting mechanism PSD reduces the speed of the rotation of motor generator MG2, and transmits it to power splitting mechanism PSD.

The reducer has a rotation axis coupled to the wheels via a reduction gear and a differential gear (not shown). The reducer is not essential, and a structure that transmits the rotation of motor generator MG2 to power splitting mechanism PSD without reducing its speed may be employed.

Battery unit 40 has terminals 41 and 42. Drive device 20 has terminals 43 and 44. Vehicle 100 further includes a power cable 6 connecting terminals 41 and 43 together and a power cable 8 connecting terminals 42 and 44 together.

Battery unit 40 includes a battery B, a system main relay SMR3 connected between a negative pole of battery B and terminal 42, and a system main relay SMR2 connected between a positive terminal of battery B and terminal 41 as well as a system main relay SMR1 and a limiting resistance R connected in series between the positive pole and battery B and terminal 41. System main relays SMR1-SRM3 are controlled and turned on and off according to a control signal SE provided from control device 30.

Battery unit 40 includes a voltage sensor 10 measuring a voltage VB between the terminals of battery B, and a current sensor 11 sensing a current IB flowing to battery B.

A secondary battery of nickel hydrogen, lithium ion or the like, a fuel battery or the like may be used as battery B. Instead of battery B, a capacitor of a large capacitance such as an electric double layer capacitor may be used as an electricity-storing device.

Power control unit 21 includes inverters 22 and 14 arranged corresponding to motor generators MG1 and MG2, respectively, and a step-up converter 12 arranged commonly to inverters 22 and 14.

Step-up converter 12 boosts the voltage between terminals 43 and 44. Inverter 14 converts a DC voltage applied from step-up converter 12 into a three-phase AC, and provides it to motor generator MG2.

Step-up converter 12 includes a reactor L1 having an end connected to terminal 43, power transistor elements Q1 and Q2 connected in series between output terminals of step-up converter 12 providing a boosted voltage VH, diodes D1 and D2 connected in parallel to power transistor elements Q1 and Q2, respectively, and a smoothing capacitor C2. Smoothing capacitor C2 smoothes the voltage boosted by step-up converter 12.

The other end of reactor L1 is connected to an emitter of power transistor element Q1 and a collector of power transistor element Q2. A cathode of diode D1 is connected to a collector of power transistor element Q1, and an anode of diode D1 is connected to an emitter of power transistor element Q1. A cathode of diode D2 is connected to a collector of power transistor element Q2, and an anode of diode D2 is connected to an emitter of power transistor element Q2.

Inverter 14 converts the DC voltage provided from step-up converter 12 into a three-phase AC, and provides it to motor generator MG2 driving the wheels. When regenerative braking is performed, inverter 14 returns the electric power generated by motor generator MG2 to step-up converter 12. In this operation, control device 30 controls step-up converter 12 to operate as a step-down converter.

Inverter 14 includes U-, V- and W-phase arms 15, 16 and 17, respectively. U-, V- and W-phase arms 15, 16 and 17 are connected in parallel between output lines of step-up converter 12.

U-phase arm 15 includes power transistor elements Q3 and Q4 connected in series, and diodes D3 and D4 connected in parallel to power transistor elements Q3 and Q4, respectively. Diode D3 has a cathode connected to a collector of power transistor element Q3 and an anode connected to an emitter of power transistor element Q3. Diode D4 has a cathode connected to a collector of power transistor element Q4 and an anode connected to an emitter of power transistor element Q4.

V-phase arm 16 includes power transistor elements Q5 and Q6 connected in series, and diodes D5 and D6 connected in parallel to power transistor elements Q5 and Q6, respectively. A cathode of diode D5 is connected to a collector of power transistor element Q5, and an anode of diode D5 is connected to an emitter of power transistor element Q5. A cathode of diode D6 is connected to a collector of power transistor element Q6, and an anode of diode D6 is connected to an emitter of power transistor element Q6.

W-phase arm 17 includes power transistor elements Q7 and Q8 connected in series, and diodes D7 and D8 connected in parallel to power transistor elements Q7 and Q8, respectively. A cathode of diode D7 is connected to a collector of power transistor element Q7, and an anode of diode D7 is connected to an emitter of power transistor element Q7. A cathode of diode D8 is connected to a collector of power transistor element Q8, and an anode of diode D8 is connected to an emitter of power transistor element Q8.

An intermediate point of each phase arm is connected to the phase end of each phase coil of motor generator MG2. More specifically, motor generator MG2 is a three-phase permanent magnet synchronous motor. Ends on one side of the three, i.e., U-, V- and W-phase coils are connected to a neutral point. The other end of the U-phase coil is connected to a connection node of power transistor elements Q3 and Q4. The other end of the V-phase coil is connected to a connection node of power transistor elements Q5 and Q6. The other end of the U-phase coil is connected to a connection node of power transistor elements Q7 and Q8.

In the example shown in FIG. 1, power transistor elements Q1-Q8 are Insulated Gate field-effect Bipolar Transistors (IGBTs), but SiC Metal Oxide Semiconductor Field-Effect Transistors (MOSFETs) or the like that can operate at a higher temperature may be used.

A current sensor 24 senses the current flowing through motor generator MG2 as a motor current value MCRT2, and provides it to control device 30.

Inverter 22 is connected to step-up converter 12 in parallel with inverter 14. Inverter 22 converts the DC voltage provided from step-up converter 12 into a three-phase AC, and provides it to motor generator MG1. Inverter 22 receives the boosted voltage, and drives motor generator MG1, e.g., for starting the engine.

Inverter 22 returns, to step-up converter 12, the power that is generated by motor generator MG1 driven by the rotation torque transmitted from the crankshaft of the engine. In this operation, step-up converter 12 is controlled by control device 30 to operate as a step-down circuit.

Although not shown, inverter 22 has substantially the same internal structure as inverter 14, and description thereof is not repeated.

Control device 30 receives torque command values TR1 and TR2, motor revolution speeds MRN1 and MRN2, voltages VB, VL and VH, a value of current IB, motor current values MCRT1 and MCRT2, and a start signal IGON.

Torque command value TR1, motor revolution speed MRN1 and motor current value MCRT1 relate to motor generator MG1, and torque command value TR2, motor revolution speed MRN2 and motor current value MCRT2 relate to motor generator MG2.

Voltage VB is the voltage of battery B, and current IB is the current flowing through battery B. Voltage VL is a voltage of step-up converter 12 that is not yet boosted, and voltage VH is a boosted voltage of step-up converter 12.

Control device 30 provides to step-up converter 12 a control signal PWU instructing the step-up, a control signal PWD instructing the step-down and a signal CSDN instructing shut-down of the operation.

Further, control device 30 provides to inverter 14 a drive instruction PWMI2 for converting a DC voltage, i.e., the output of step-up converter 12 into an AC voltage for driving motor generator MG2, and also provides a regeneration instruction PWMC2 for converting the AC voltage generated by motor generator MG2 into an AC voltage and returning it toward step-up converter 12.

Likewise, control device 30 provides to inverter 22 a drive instruction PWMI1 for converting the DC voltage into an AC voltage for driving motor generator MG1, and a regeneration instruction PWMC1 for converting the AC voltage generated by motor generator MG1 into a DC voltage and returning it toward step-up converter 12.

Figure 2:
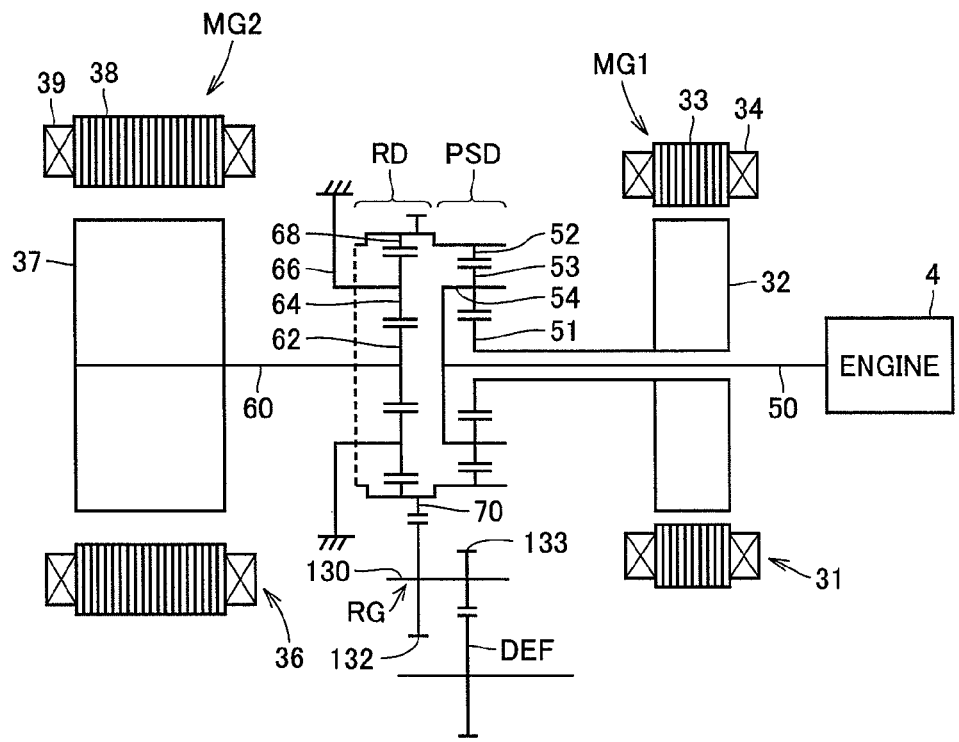
FIG. 2 is a schematic view illustrating details of a power splitting mechanism PSD and a reducer RD in FIG. 1.

FIG. 2 is a schematic view for specifically illustrating power splitting mechanism PSD and reducer RD in FIG. 1.

Referring to FIG. 2, this vehicle drive device includes motor generator MG2, reducer RD connected to the rotation axis of motor generator MG2, the axle rotating according to the rotation of the rotation axis at the speed reduced by reducer RD, engine 4, motor generator MG1, and power splitting mechanism PSD distributing the power among reducer RD, engine 4 and motor generator MG1. Reducer RD transmits the power from motor generator MG2 to power splitting mechanism PSD at a reduction ratio, e.g., of two or more.

A crankshaft 50 of engine 4, a rotor 32 of motor generator MG1 and a rotor 37 of motor generator MG2 rotate coaxially with each other.

In the example shown in FIG. 2, power splitting mechanism PSD is a planetary gear including a sun gear 51 coupled to a hollow sun gear shaft through which crank shaft 50 coaxially extends, a ring gear 52 carried rotatably and coaxially with crank shaft 50, pinion gears 53 arranged between sun gear 51 and ring gear 52 and revolving around sun gear 51 while rotating on its own axis, and a planetary carrier 54 coupled to an end of crank shaft 50 and carrying a rotation axis of each pinion gear 53.

Power splitting mechanism PSD has three power input/output shafts, i.e., a sun gear shaft coupled to sun gear 51, a ring gear casing coupled to ring gear 52 and crank shaft 50 coupled to planetary carrier 54. When the powers that are input or output to/from two of these three shafts is determined, the power that is input or output to/from the other one shaft is determined depending on the above powers input or output to/from the two shafts.

A counter drive gear 70 for taking out the power is arranged outside the ring gear casing for integral rotation with ring gear 52. Counter drive gear 70 is connected to a power transmission reduction gear RG for power transmission between counter drive gear 70 and power transmission reduction gear RG. Power transmission reduction gear RG drives a differential gear DEF. On a downward slope or the like, the rotation of the wheels is transmitted to differential gear DEF, which in turn drives power transmission reduction gear RG.

Motor generator MG1 includes a stator 31 forming a rotating magnetic field, and a rotor 32 that is arranged inside stator 31 and has a plurality of permanent magnets embedded therein. Stator 31 includes a stator core 33 and three-phase coil 34 wound around stator core 33. Rotor 32 is coupled to the sun gear shaft rotating together with sun gear 51 of power splitting mechanism PSD. Stator core 33 is formed of stacked thin plates of electromagnetic steel, and is fixed to a casing (not shown).

Motor generator MG1 operates as an electric motor that drives and rotates rotor 32 by a mutual operation of the magnetic field formed by the permanent magnets embedded in rotor 32 and the magnetic field formed by three-phase coil 34, Motor generator MG1 also operates as an electric generator that generates an electromotive force on the opposite ends of three-phase coil 34 by the mutual operation of the magnetic field formed by the permanent magnets and the rotation of rotor 32.

Motor generator MG2 includes a stator 36 forming the rotating magnetic field, and also includes rotor 37 arranged inside stator 31 and having the plurality of permanent magnets embedded therein. Stator 36 has a stator core 38 and a three-phase coil 39 wound around stator core 38.

Rotor 37 is coupled via reducer RD to the ring gear casing that rotates together with ring gear 52 of power splitting mechanism PSD. Stator core 38 is formed of stacked thin plates of electromagnetic steel, and is fixed to a casing (not shown).

Motor generator MG2 operates as an electric generator that generates an electromotive force on the opposite ends of three-phase coil 39 by the mutual operation of the magnetic field formed by the permanent magnets and the rotation of rotor 37. Motor generator MG2 also operates as an electric motor that drives and rotates rotor 37 by the mutual operation of the magnetic field formed by the permanent magnets and the magnetic field formed by three-phase coil 39.

Reducer RD performs the speed reduction by the structure in which a planetary carrier 66, i.e., one of rotation elements of a planetary gear is fixed to the casing of the vehicle drive device. More specifically, reducer RD has a sun gear 62 coupled to the shaft of rotor 37, a ring gear 68 rotating together with ring gear 62 and pinion gears 64 that mesh with ring gear 68 and sun gear 62 and transmit the rotation of sun gear 62 to ring gear 68.

For example, the number of teeth of ring gear 68 is twice or more as large as that of sun gear 62, whereby the reduction ratio can be two or more.

[Description of Arrangement of Components]

Figure 3:
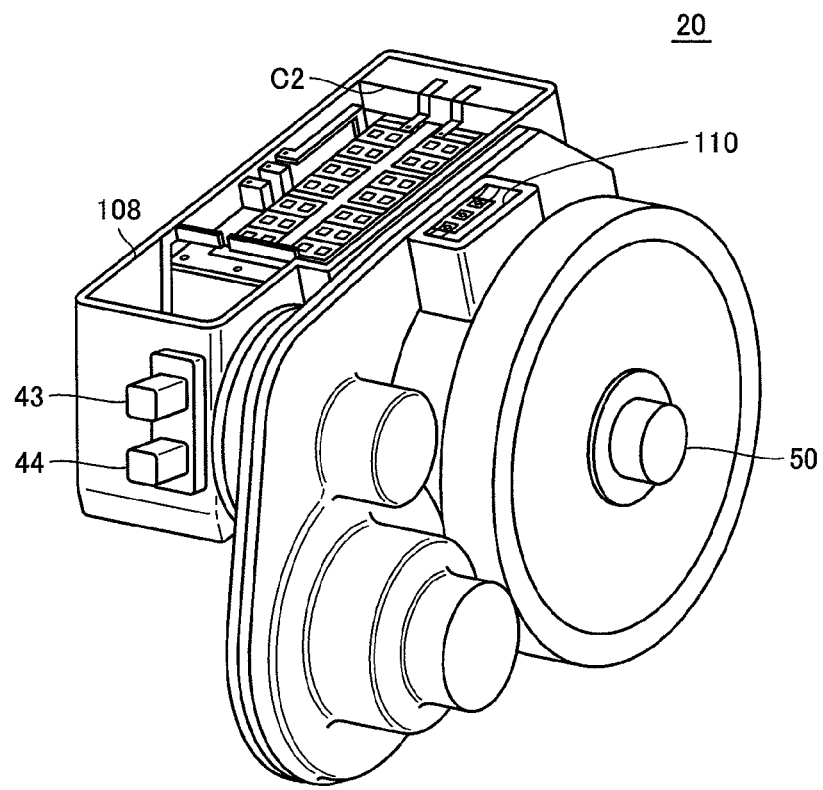
FIG. 3 is a perspective view showing an appearance of a drive device 20 of a hybrid vehicle according to the embodiment of the invention.

FIG. 3 is a perspective view showing an appearance of drive device 20 of the hybrid vehicle according to the embodiment of the invention.

Figure 4:
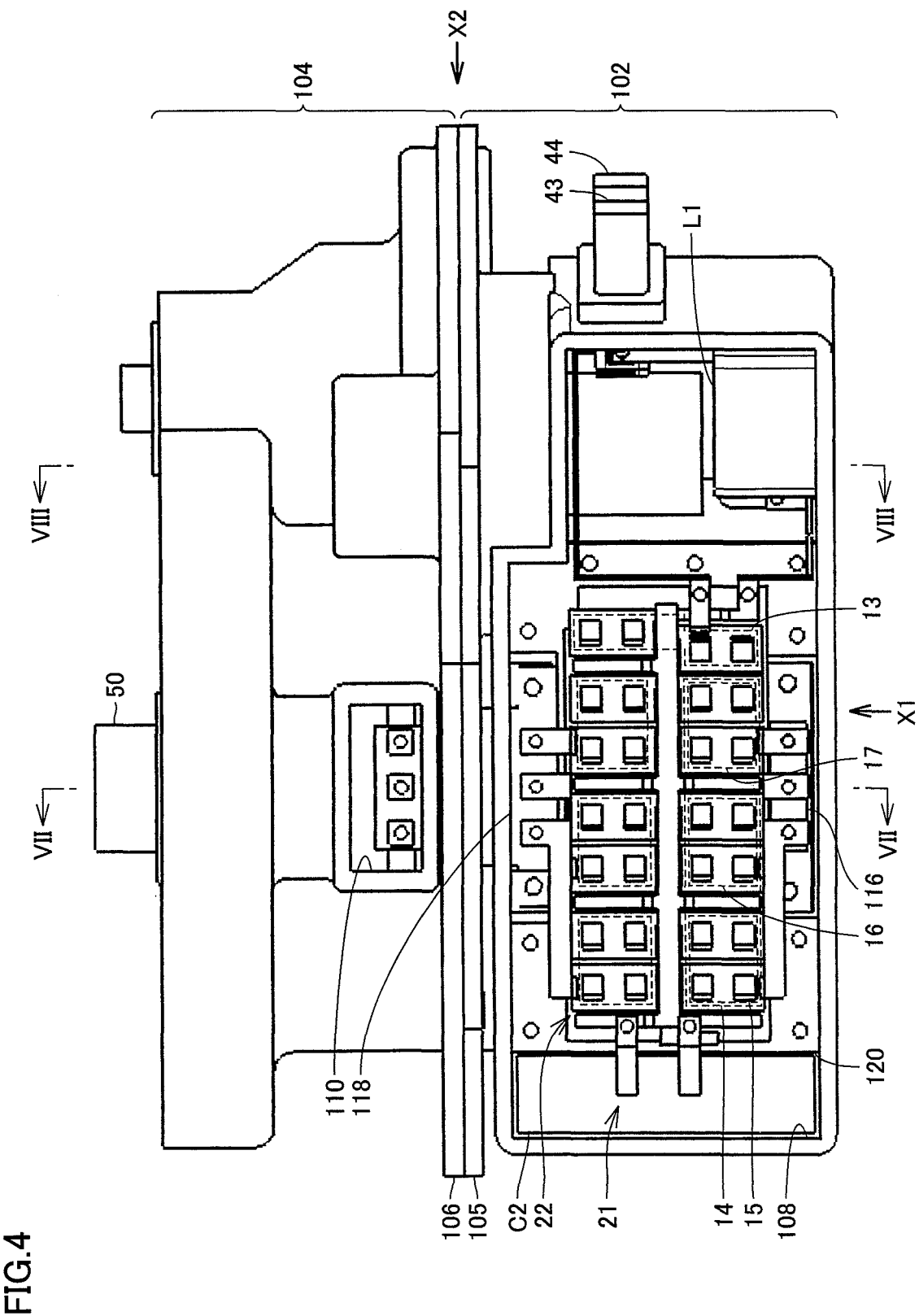
FIG. 4 is a plan of drive device 20.

FIG. 4 is a plan of drive device 20.

Referring to FIGS. 3 and 4, the casing of drive device 20 can be divided into casings 104 and 102. Casing 104 primarily accommodates motor generator MG1, and casing 102 primarily accommodates motor generator MG2 and the power control unit.

Casings 104 and 102 are provided with flanges 106 and 105, respectively, which are fixed together by bolts or the like to integrate casings 104 and 102.

Casing 102 is provided with an opening 108 for attaching the power control unit. Capacitor C2 is accommodated in a left portion (a forward portion in a vehicle traveling direction) of opening 108, a power element board 120 and terminal bases 116 and 118 are accommodated in a central portion, and reactor L1 is accommodated in a right portion. In the state where the device is mounted on the vehicle, opening 108 is closed by a lid. Conversely, capacitor C2 and reactor L1 may be accommodated in the right and left portions, respectively.

Thus, reactor L1 is arranged on one of the opposite sides of the rotation axes of motor generators MG1 and MG2, and capacitor C2 is arranged on the other side of the rotation axes. A power element board 120 is arranged in a region between capacitor C2 and reactor L1. Motor generator MG2 is arranged under power element board 120.

Inverters 22 and 14 controlling respective motor generators MG1 and MG2 as well as an arm unit 13 of the step-up converter are arranged on power element board 120.

Bus bars for power supply that are vertically stacked together are arranged between inverters 14 and 22. One bus extends from each of U-, V- and W-phase arms 15, 16 and 17 of inverter 14 toward terminal base 116 connected to the stator coil of motor generator MG2. Likewise, three bus bars extend from inverter 22 toward terminal base 118 connected to the stator coil of motor generator MG1.

Since power element board 120 tends to become hot, an oil passage to be described later is arranged under power element board 120 for cooling it.

The voltage supplied from battery unit 40 in FIG. 1 to terminals 43 and 44 via power cables is boosted by step-up converter 12 including reactor L1 and arm unit 13, is smoothed by capacitor C2 and is supplied to inverters 14 and 22.

As described above, step-up converter 12 is used for boosting the battery voltage to be used. Therefore, the battery voltage can be low and at about 200 V, and further the motor generator can be driven with a high voltage exceeding 500 V. Thus, the power supply can be performed with the small current so that the electric power loss can be suppressed, and further the high output of the motor can be achieved.

Drive device 20 may have a structure that integrally includes step-up converter 12 in addition to inverters 14 and 22 as well as motor generators MG1 and MG2. In this case, reactor L1 and capacitor C2 that are relatively large parts may cause a problem relating to arrangement positions.

Figure 5:
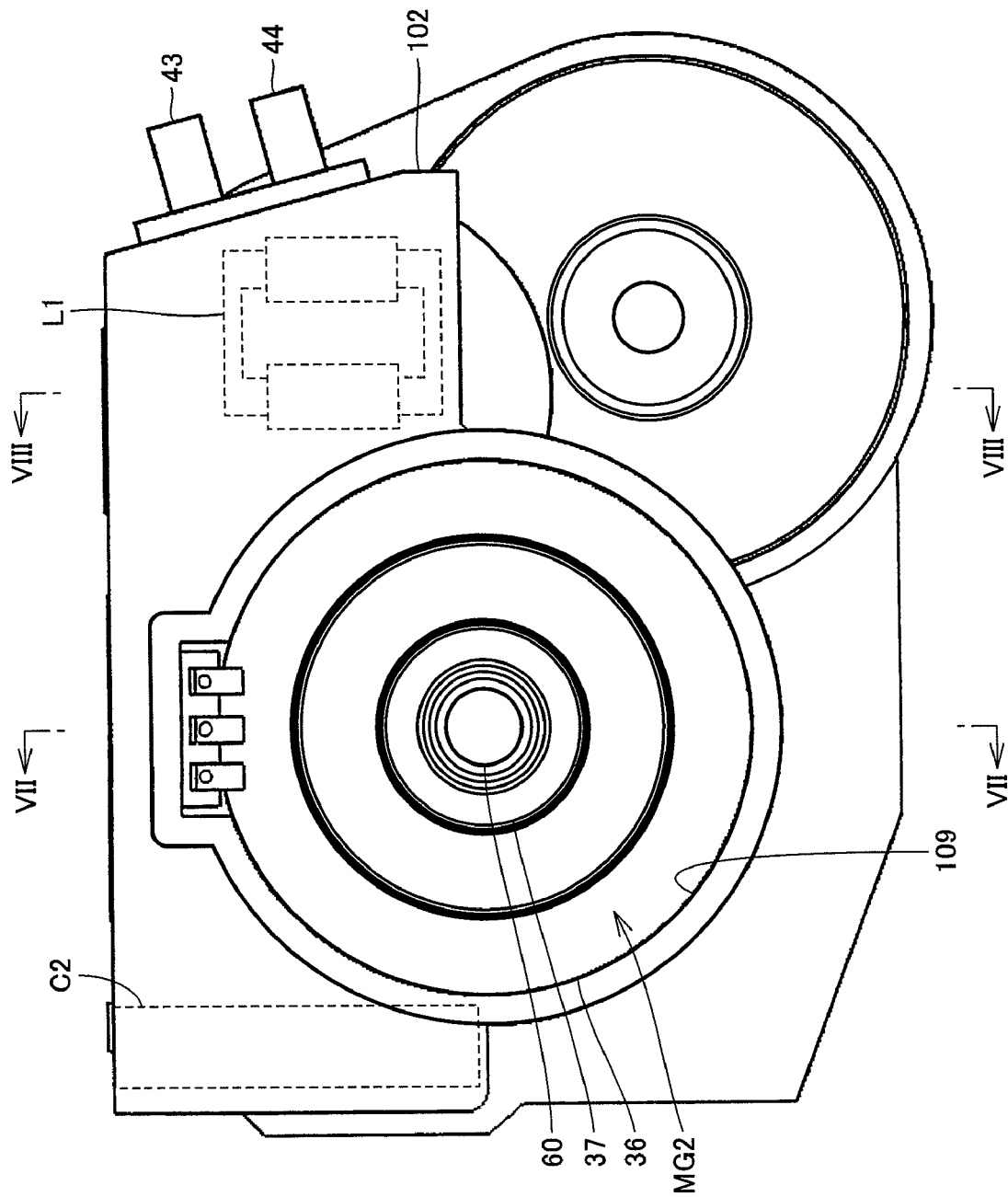
FIG. 5 is a side view of drive device 20 viewed in a direction X1 in FIG. 4.

FIG. 5 is a side view of drive device 20 viewed in a direction X1 in FIG. 4.

Referring to FIG. 5, casing 102 is provided with an opening 109 for attachment and maintenance of the motor generator. In the state where the device is mounted on the vehicle, opening 109 is closed by a lid.

Motor generator MG2 is arranged inside opening 109. Rotor 37 is arranged inside stator 36 connected to the U-, V- and W-phase bus bars. A hollow shaft 60 can be seen in a central portion of rotor 37.

This drive device of the hybrid vehicle includes motor generator MG2, motor generator MG1 that has the rotor coaxial with that of motor generator MG2 and is located behind motor generator MG2, the power splitting mechanism that is arranged coaxial with the crank shaft and is located between motor generators MG1 and MG2, and power control unit 21 in FIG. 1 controlling motor generators MG1 and MG2.

In power control unit 21 shown in FIG. 1, reactor L1 and smoothing capacitor C2 are arranged on one and the other of the opposite sides of the rotation axis of motor generator MG2 and thus in a divided fashion as shown in FIG. 5, respectively. Motor generators MG1 and MG2, the power splitting mechanism and power control unit 21 are accommodated in a metal casing and are integrated.

Thus, stator 36 of motor generator MG2 protrudes into an accommodating chamber accommodating power control unit 21 of casing 102 to a large extent. Therefore, reactor L1 and capacitor C2 are arranged on one and the other sides of motor generator MG2, respectively, so that the large parts are accommodated with high efficiency. Therefore, the compact drive device of the hybrid vehicle is achieved.

Figure 6:
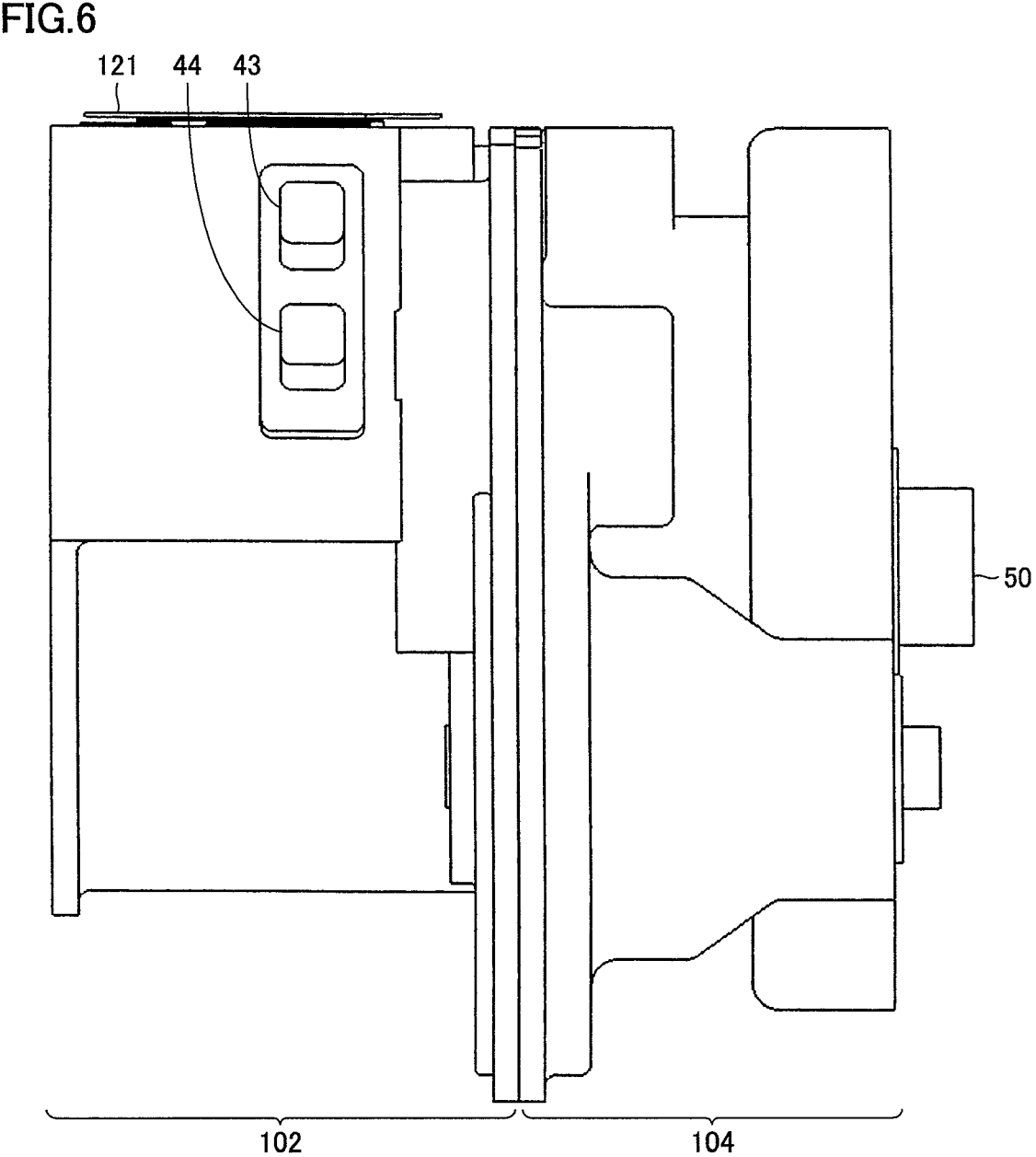
FIG. 6 is a side view of drive device 20 viewed in a direction X2 in FIG. 4.

FIG. 6 is a side view showing drive device 20 viewed in a direction X2 in FIG. 4. In FIG. 6, a control board 121 controlling the power elements is arranged above the power element board.

Figure 7:
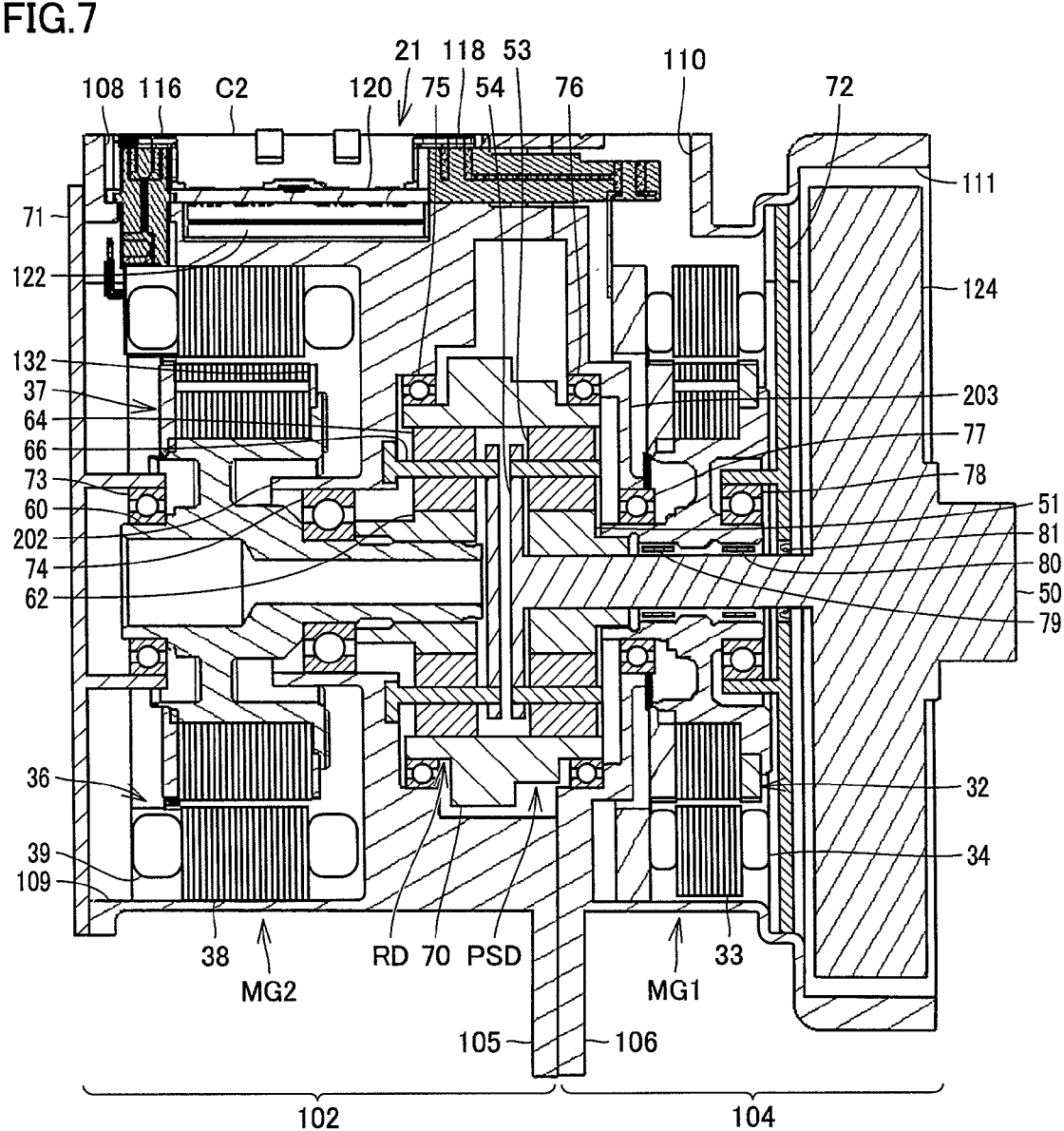
FIG. 7 is a cross section taken along line VII-VII in FIG. 4.

FIG. 7 is a cross section taken along line VII-VII in FIG. 4.

Referring to FIGS. 6 and 7, crankshaft 50 of the engine is connected to a damper 124, of which output shaft is connected to power splitting mechanism PSD.

Damper 124, motor generator MG1, power splitting mechanism PSD, reducer RD and motor generator MG2 are coaxially arranged in this order in a direction from the engine side to the other side. Rotor 32 of motor generator MG1 has a hollow shaft, through which an output shaft of damper 124 extends.

The shaft of rotor 32 of motor generator MG1 is spline-engaged with sun gear 51 on the side of power splitting mechanism PSD. The shaft of damper 124 is coupled to planetary carrier 54. Planetary carrier 54 carries rotation axis of pinion gears 53 for revolution around the shaft of damper 124. Pinion gears 53 mesh with sun gear 51 and ring gear 52 in FIG. 2 formed on the inner periphery of the ring gear casing.

On the side near reducer RD, rotor shaft 60 of motor generator MG2 is spline-engaged with sun gear 62. Planetary carrier 66 of reducer RD is fixed to a partition 202 of casing 102. Planetary carrier 66 carries the rotation axes of pinion gears 64. Pinion gears 64 mesh with sun gear 62 and ring gear 68 in FIG. 2 formed on the inner periphery of the ring gear casing.

As can be seen from FIG. 7, motor generator MG1 and damper 124 can be attached for assembly through an opening 111 on the right side in FIG. 7 of casing 104, and motor generator MG2 can be attached through opening 109 on the left side of casing 102. Reducer RD and power splitting mechanism PSD can be attached from a boundary plane between flanges 105 and 106.

Opening 109 of casing 102 is sealedly closed by a lid 71, a liquid gasket and the like for preventing leakage of lubricating oil. A lid 72 is arranged on the inner side with respect to opening 111 of casing 104, and the space accommodating MG1 is sealedly closed by a liquid gasket, an oil sealing 81 and the like for preventing leakage of the lubricating oil.

The shaft of rotor 32 of motor generator MG1 is rotatably carried by ball bearings 78 and 77 held by lid 72 and a partition 203, respectively. Rotor 32 has the hollow shaft, through which the shaft of damper 124 extends. Needle bearings 79 and 80 are arranged between the shafts of rotor 32 and damper 124.

The shaft of rotor 37 of motor generator MG2 is rotatably carried by ball bearings 73 and 74 held by lid 71 and partition 202, respectively.

The ring gear casing provided at its inner peripheries with both the ring gears of reducer RD and power splitting mechanism PSD are rotatably carried by ball bearings 75 and 76 held by partitions 202 and 203, respectively.

The accommodation chamber accommodating power control unit 21 and the accommodation chamber accommodating motor generator MG2 are isolated from each other by partition 202 of casing 102, but are partially connected together via a through hole into which terminal base 116 is inserted. The bus bar of the stator coil of motor generator MG2 is connected to one side of terminal base 116, and the bus bar of inverter 14 is connected to the other side thereof. An electrically conductive material extends through the inside of terminal base 116 for electrically connecting these bus bars. Thus, terminal base 116 is configured to prevent passage of a lubricating oil component flowing from motor generator MG2 but to allow passage of electricity.

Likewise, terminal base 118 connects the space accommodating the power control unit and the space accommodating motor generator MG1 together such that it can pass the electricity but does not pass the lubricating oil component.

Figure 8:
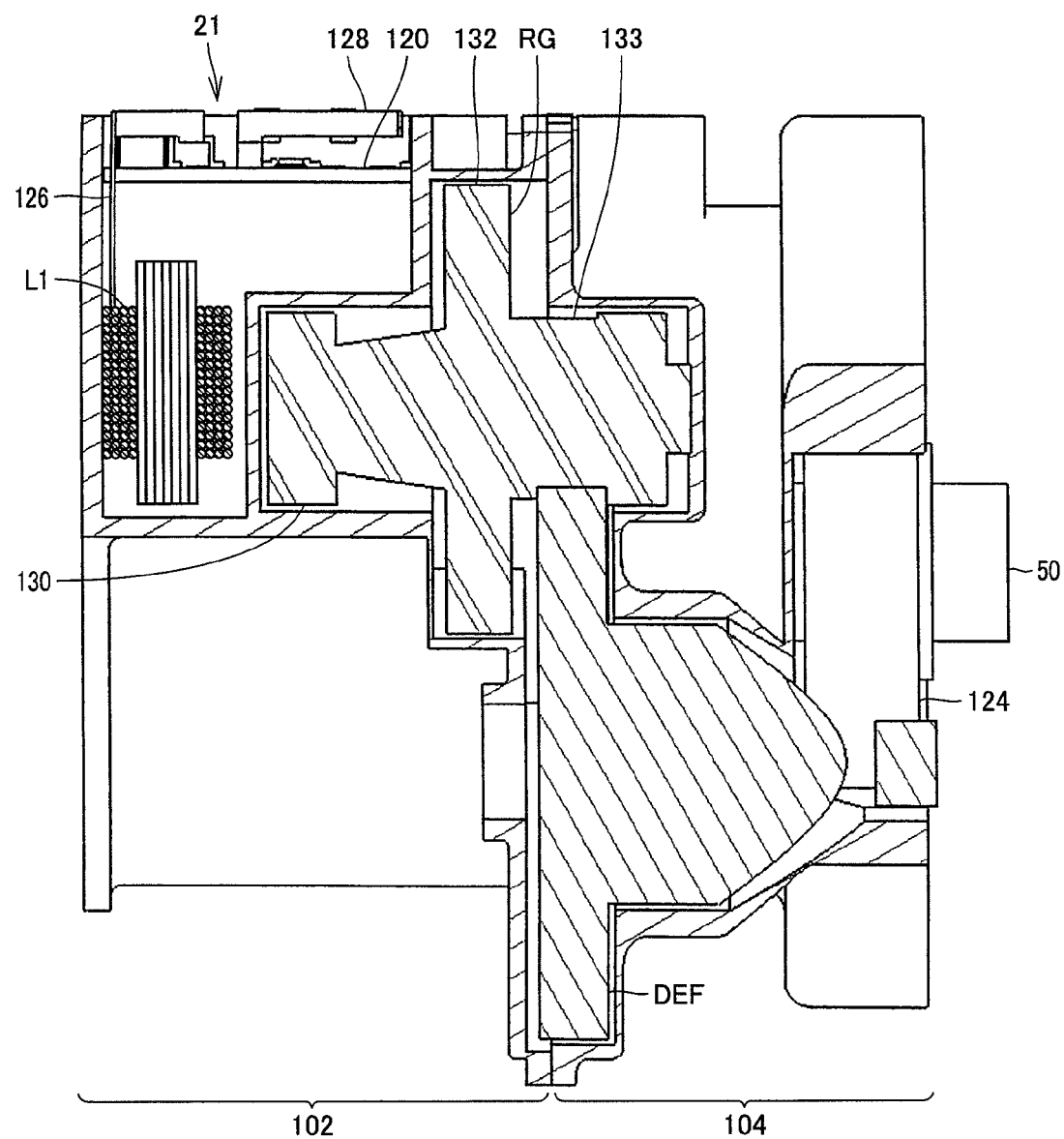
FIG. 8 is a cross section taken along line VIII-VIII in FIG. 4.

FIG. 8 is a cross section taken along line VIII-VIII in FIG. 4.

Referring to FIG. 8, a section of reactor L1 is shown in the accommodating chamber accommodating power control unit 21. For example, reactor L has a core formed of electromagnetic steel plates stacked together as well as a coil wound around the core.

A rotation axis 130 of reduction gear RG shown in FIG. 2 is arranged near reactor L1, and a counter driven gear 132 of reduction gear RG is arranged in a central position. Counter driven gear 132 meshes with counter drive gear 70 in FIG. 2. A final drive gear 133 is arranged coaxial with counter driven gear 132, and meshes with a final driven gear, i.e., differential gear DEF shown under it.

As described above, the components of the power control unit, i.e., power element board 120, reactor L1 and capacitor C2 are arranged using a space left around motor generators MG1 and MG2, reducer RD and power splitting mechanism PSD as well as reduction gear RG and differential gear DEF. Thereby, it is possible to achieve the compact drive device of the hybrid vehicle while keeping a small height.

[Description of Cooling System]

Figure 9:
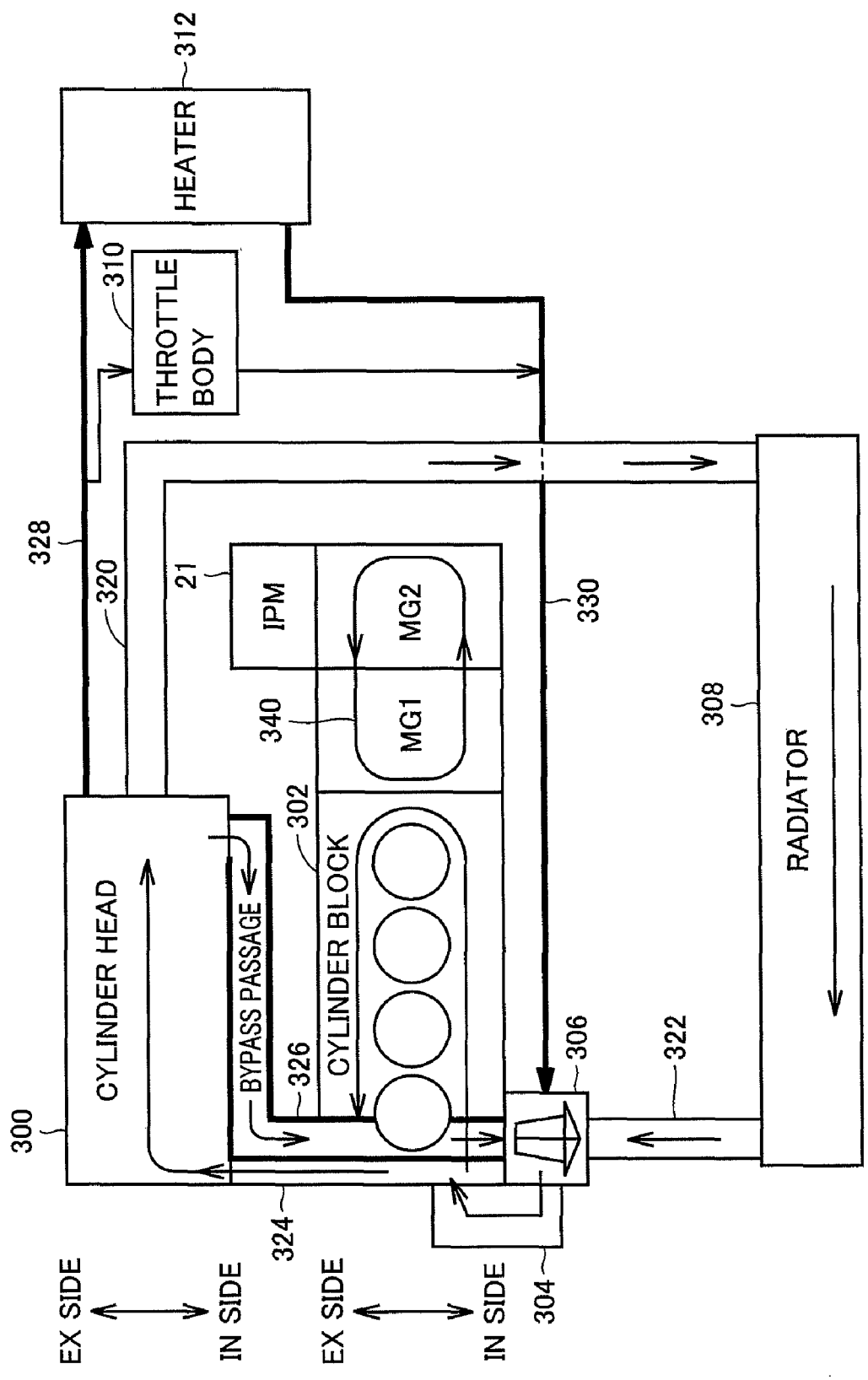
FIG. 9 is a block diagram showing a cooling system of the drive device of the hybrid vehicle of the embodiment.

FIG. 9 is a block diagram showing a cooling system of the drive device of the hybrid vehicle of the embodiment.

Referring to FIG. 9, a water pump 304 feeds cooling water to a cylinder block 302 and a cylinder head 300. When the engine is not yet warmed up sufficiently, a thermostat valve 306 selects a bypass passage instead of a passage extending from a radiator so that the cooling water discharged from water pump 304 flows through cylinder block 302 and cylinder head 300, and returns through a bypass passage 326 to water pump 304.

When it is extremely cold, hot water flowing from a hot water passage 328 of the cylinder head enters a hot water passage formed in a throttle body 310, and returns through a hot water passage 330 to water pump 304. The cooling water that was heated by flowing through the cylinder head is also passed to a heater 312 by hot water passages 328 and 330. Thereby, the heat of the engine is also used for heating a cabin of the vehicle.

When the engine is warmed up sufficiently, thermostat valve 306 switches the inlet from bypass passage 326 to a passage 322 extending from a radiator 308. Thereby, the cooling water fed from water pump 304 flows through cylinder block 302, cylinder head 300, a passage 320, radiator 308 and passage 322 in this order, and returns to water pump 304.

As described above, cylinder block 302 is internally provided with the cooling water passage, and the cooling water flows from the intake side to the exhaust side through a passage around four cylinders as indicated by an arrow in FIG. 9. In this manner, cylinder block 302 of the engine is kept at an appropriate temperature by the circulation of the cooling water.

In power control unit 21 including the inverter as well as motor generators MG1 and MG2, the heat transmission is primarily performed by the lubricating oil circulating through an oil circulation path 340. Thus, power control unit 21 includes an Intelligent Power Module (IPM) cooled by direct heat exchange with the lubricating oil without interposing a cooling system using other liquid medium such as cooling water. The casing of motor generator MG1 is fixed to cylinder block 302 by bolts and the like, and the heat transmission is performed by head conduction through contact portions of metal portions.

In the prior art, power control unit 21 is generally cooled by a water-cooling system. However, an element such as an SiC-MOS that can operate at a high temperature may be used as the power transistor element so that the unit can operate at a temperature substantially equal to the heat resistant temperature of the motor generator. Therefore, it becomes possible to eliminate the water-cooling system dedicated to power control unit 21, and the oil-cooling system also used by the motor generator can be employed so that the whole structure can be compact.

In the embodiment employing the above structure, power control unit 21 including the inverter as well as motor generators MG1 and MG2 are primarily cooled by the heat exchange with the lubricating oil, although the heat is partially released by radiation or the like.

Therefore, the heat generated in power control unit 21 and motor generators MG1 and MG2 is transmitted by the lubricating oil to the casing of motor generator MG1, and is further transmitted from the casing to cylinder block 302. Since cylinder block 302 is cooled by the cooling water, the temperature rising thereof is suppressed. Accordingly, the temperature rising of the power control unit and motor generators MG1 and MG2 is suppressed.

Figure 10:
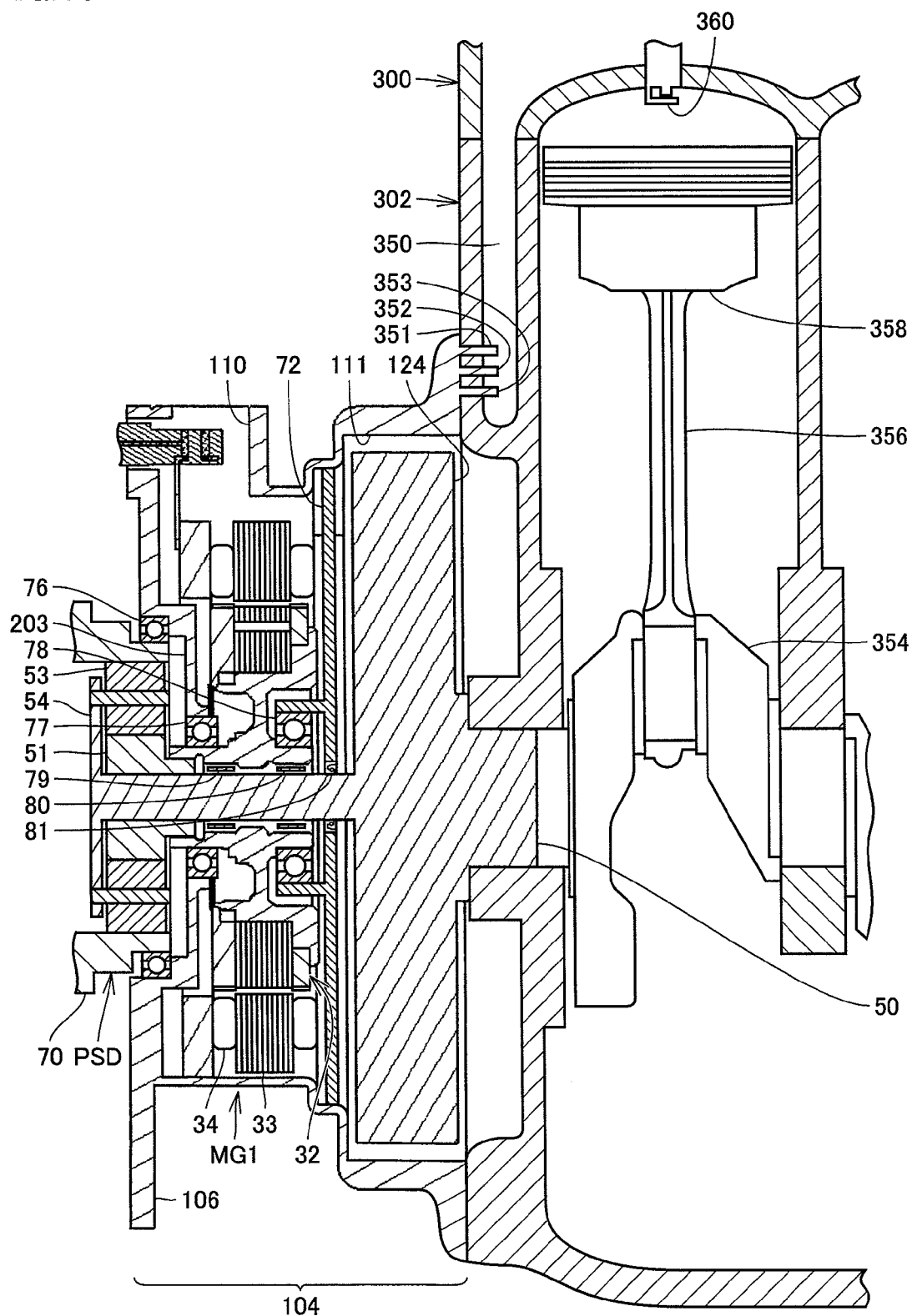
FIG. 10 shows sections of connected portions of a motor generator MG1 and a cylinder block 302.

FIG. 10 shows a section of a connection portion of motor generator MG1 and cylinder block 302 in FIG. 9.

Referring to FIG. 10, cylinder block 302 and cylinder head 300 form a combustion chamber. An ignition plug 360 is arranged in an upper portion of the combustion chamber. A piston 358 vertically reciprocates in the cylinder, and a connecting rod 356 transmits the vertical motion of the piston to a crankshaft 354 to change it into a rotational motion. Crankshaft 354 has an end coupled to damper 124.

A water jacket 350 is arranged beside the cylinder in which piston 358 vertically moves. The cooling water flows through water jacket 350 to cool the cylinder forming the combustion chamber in which the piston vertically moves.

Fins 351-353 are arranged on a portion where casing 104 of motor generator MG1 is joined to cylinder block 302, and are projected through the outer wall of cylinder block 302 into water jacket 350. Therefore, the heat transmitted to casing 104 is appropriately removed by the cooling water flowing in water jacket 350 through fins 351-353. Sealing members such as O-rings, liquid gaskets and the like are arranged around the fitted portions of fins 351-353 for preventing leakage of the cooling water.

Figure 11:
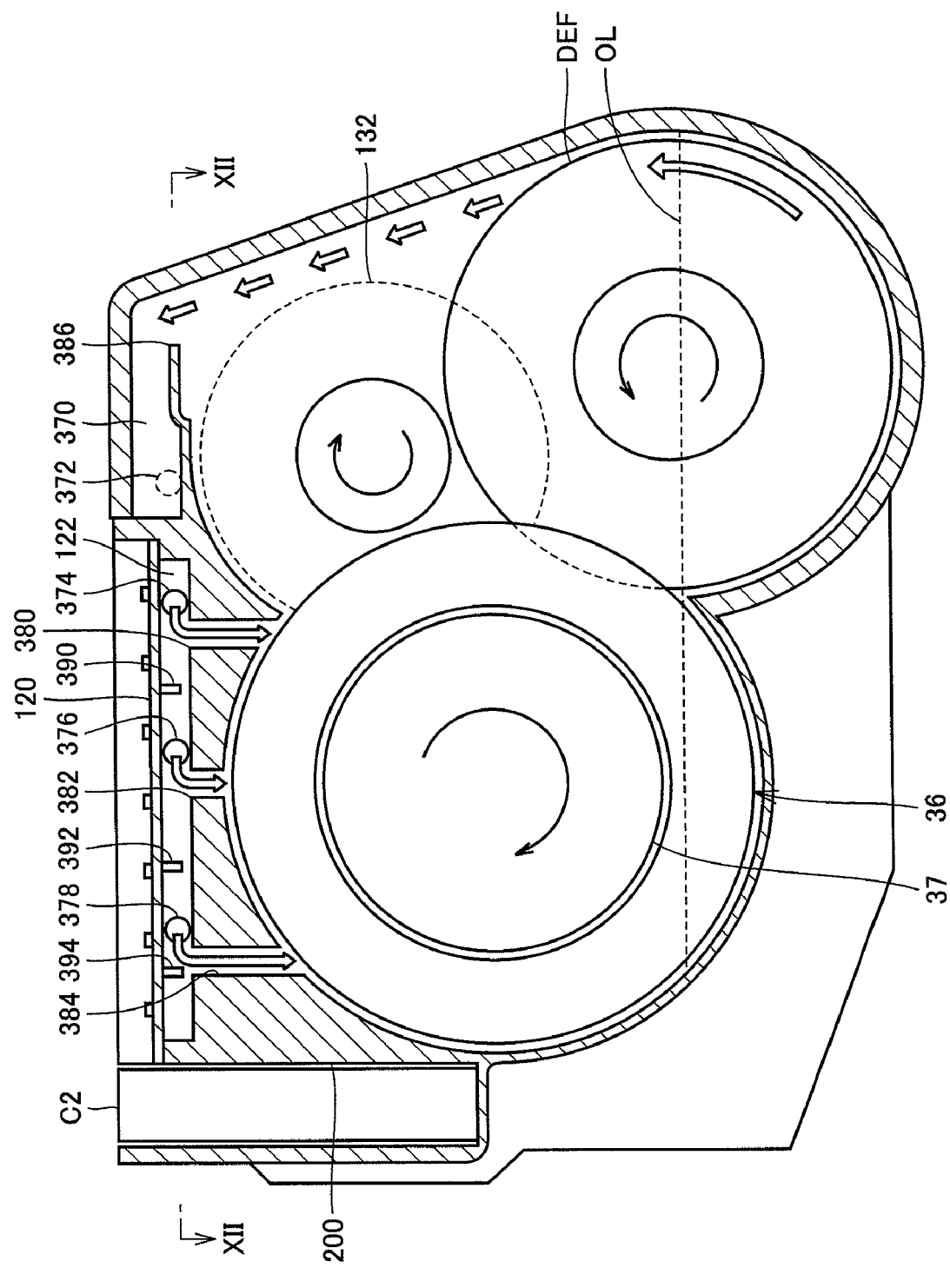
FIG. 11 is a cross section showing an oil circulation path 340 in FIG. 9.

FIG. 11 is a cross section showing oil circulation path 340 in FIG. 9.

FIG. 11 shows sections of the boundary portions of the casings of the accommodating chambers accommodating motor generator MG2 and power control unit 21, respectively, and the portion accommodating reduction gear RG and differential gear DEF.

Figure 12:
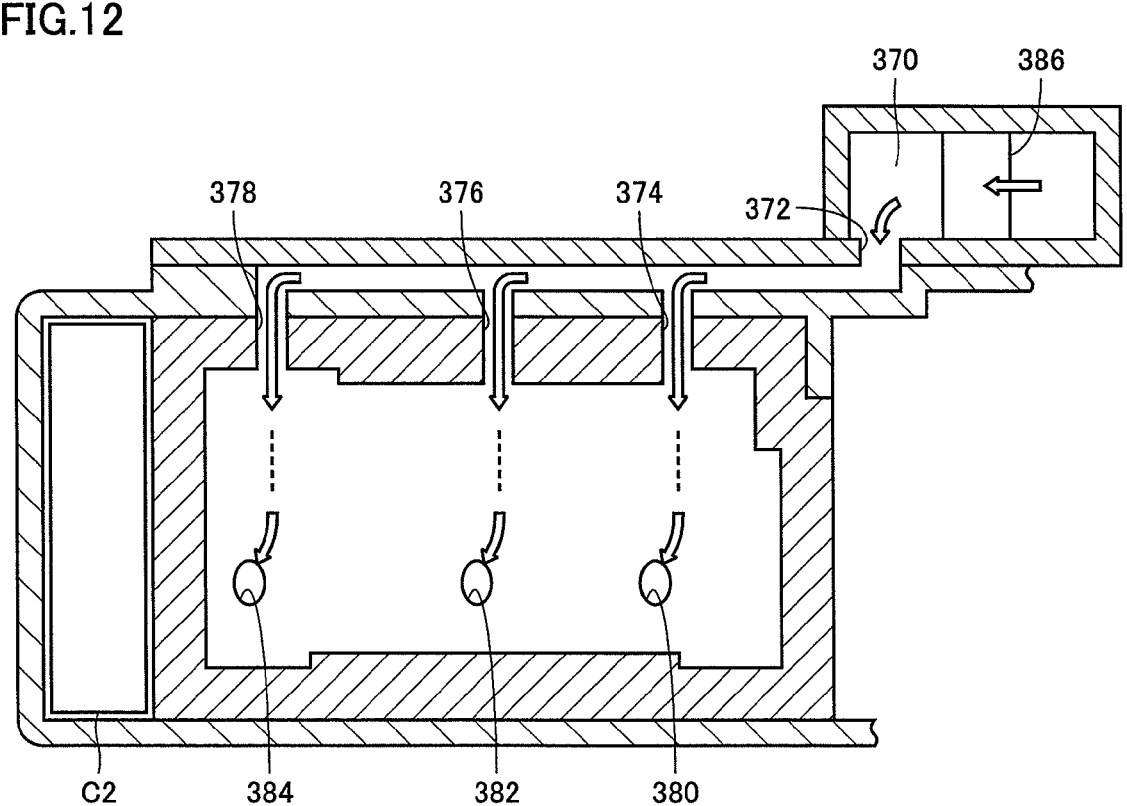
FIG. 12 is a fragmentary section taken along line XII-XII in FIG. 11.

FIG. 12 is a fragmentary cross section taken along line XII-XII in FIG. 11.

Referring to FIGS. 11 and 12, casing 102 has a partition 200 that partitions the interior into two accommodating chambers that accommodate power control unit 21 and motor generator MG2, respectively. An oil passage 122 for cooling power element board 120 is arranged on the upper surface of partition 200, and is communicated with an oil reservoir 370 and the accommodating chamber of motor generator MG2. A liquid gasket or the like seals a space between power element board 120 and partition 200 for preventing the lubricating oil in motor generator MG2 from leaking toward board 120.

The lubricating oil is stored at an oil level OL in a bottom portion of the casing. This casing bottom portion corresponds to an oil pan. Another structure in which an independent oil pan is attached to the bottom of the casing may be employed. The rotation of rotor 37 and the like rotates counter drive gear 70 in FIG. 2. Counter drive gear 70 rotates counter driven gear 132, which in turn rotates differential gear DEF.

Thereby, differential gear DEF splashes the lubricating oil as indicated by arrows in FIG. 11. An oil catch plate 386 is arranged in an upper portion of the casing, and the oil splashed by differential gear DEF is reserved in oil reservoir 370. Oil reservoir 370 is located upstream to the power control unit including board 120 in the circulation path of the lubricating oil. Oil reservoir 370 has an oil outlet 372, which is communicated with oil inlets 374, 376 and 378 of the space under board 120 as shown in FIG. 12.

Fins 390, 392 and 394 for radiating the heat to the oil are arranged on a rear surface of board 120 opposite to the power element carrying surface, and the heat of the power element is radiated to the lubricating oil through these fins. Thereafter, the lubricating oil is discharged to an upper portion of stator 36 through oil outlets 380, 382 and 384 arranged in partition 200. The lubricating oil flows along the outer periphery of stator 36, and returns to the bottom of the casing.

In the modification shown in FIGS. 11 and 12, the drive device of the vehicle includes motor generator MG2, the lubricating mechanism for the lubricating oil that lubricates and cools motor generator MG2, power control unit 21 that controls motor generator MG2, is arranged on the circulation path of the lubricating oil and is cooled by the lubricating oil, and the casing that accommodates motor generator MG2, the circulating mechanism and the power control unit, and is provided with the circulation path of the lubricating oil.

Differential gear DEF and oil catch plate 386 correspond to the "lubricating mechanism of the lubricating oil", and oil reservoir 370 and oil passage 122 correspond to a part of the "circulation path of the lubricating oil".

Differential gear DEF in the "circulating mechanism of the lubricating oil" corresponds to the "mechanism drawing up the lubricating oil from the oil pan according to the rotation of the rotating electric machine and feeding the lubricating oil to a portion of the lubrication path upstream to the power control unit".

Power control unit 21 includes board 120 having a first main surface carrying the power control element, capacitor C2 and reactor L1 of which position is shown in FIG. 5. Board 120 is provided on its second main surface with radiator fins 390, 392 and 394 that are in contact with the lubricating oil in the circulation path.

As described above, the lubricating oil of the motor generator is used for cooling the power transistor element portion that may become hot when the motor generator is driven. For example, various portions attain the following temperatures during the operation. The stator coil attains about 160° C., the lubricating oil attains 120° C. and the power transistor element attains 200° C. when it is a high-temperature operable element such as an SiC-MOS. Conversely, the engine housing is cooled to or below 100° C. by the cooling water.

Therefore, the heat of the lubricating oil circulating inside the motor generator is released to the housing side, and thereby the cooling can be performed without arranging a cooling water path in portions of the integrated motor and inverter. Therefore, it is possible to lower the center of mass, to reduce the required space and to improve the flexibility in design and arrangement.

Figure 13:
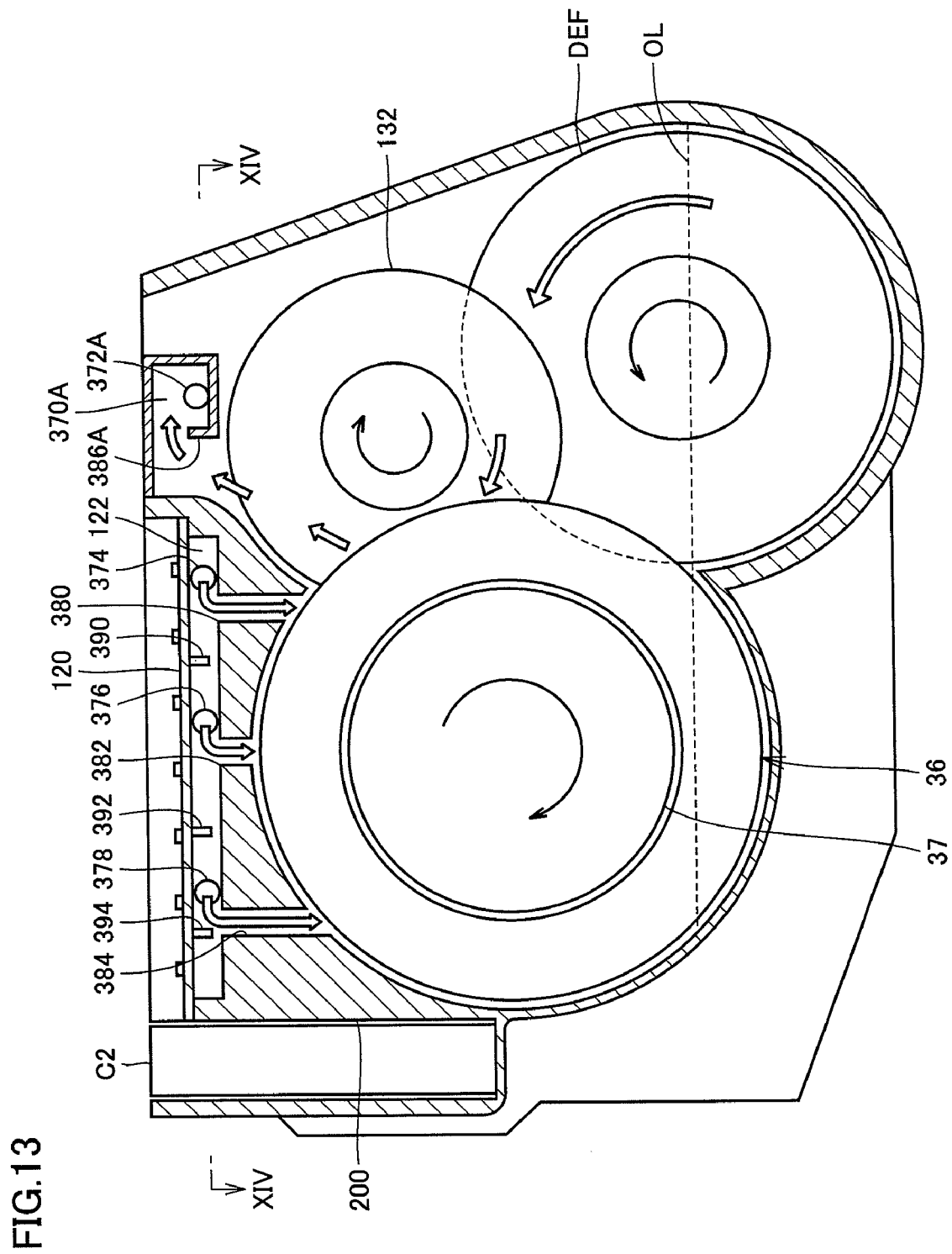
FIG. 13 shows a second example of oil circulation path 340 in FIG. 9.

FIG. 13 shows a second example of oil circulation path 340 in FIG. 9.

Figure 14:
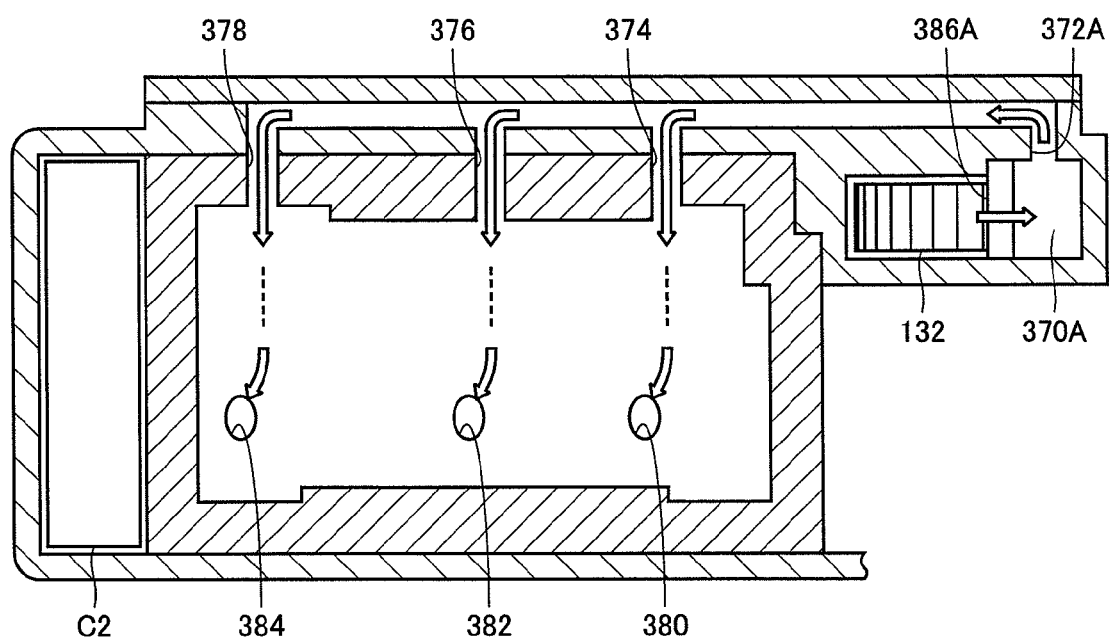
FIG. 14 is a cross section taken along line XIV-XIV in FIG. 13.

FIG. 14 is a cross section taken along line XIV-XIV in FIG. 13.

As shown in FIGS. 13 and 14, the oil scooped up by differential gear DEF lubricates counter driven gear 132. A part of the lubricating oil is splashed by counter driven gear 132, is received by an oil catch plate 386A and is kept in an oil reservoir 370A. Oil reservoir 370A is arranged in the lubrication path of the lubricating oil and particularly is located upstream to the power control unit including board 120.

An oil outlet 372A formed in oil reservoir 370A is communicated with oil inlets 374, 376 and 378 as shown in FIG. 14, and fins 390, 392 and 394 arranged on the bottom of board 120 release the heat to the lubricating oil. This lubricating oil flows through oil outlets 380, 382 and 384 onto the upper portion of stator 36, and returns through the outer wall of stator 36 to the bottom of the casing.

In the modification shown in FIGS. 13 and 14, differential gear DEF, counter driven gear 132 and oil catch plate 386A correspond to the "lubricating mechanism of the lubricating oil", and oil reservoir 370A and oil passage 122 correspond to a part of the "circulation path of the lubricating oil".

Differential gear DEF and counter driven gear 132 in the "circulating mechanism of the lubricating oil" correspond to the "mechanism drawing up the lubricating oil from the oil pan according to the rotation of the rotating electric machine and feeding the lubricating oil to a portion of the lubrication path upstream to the power control unit".

The modification shown in FIGS. 13 and 14 can achieve substantially the same effect as the example shown in FIGS. 11 and 12.

Figure 15:
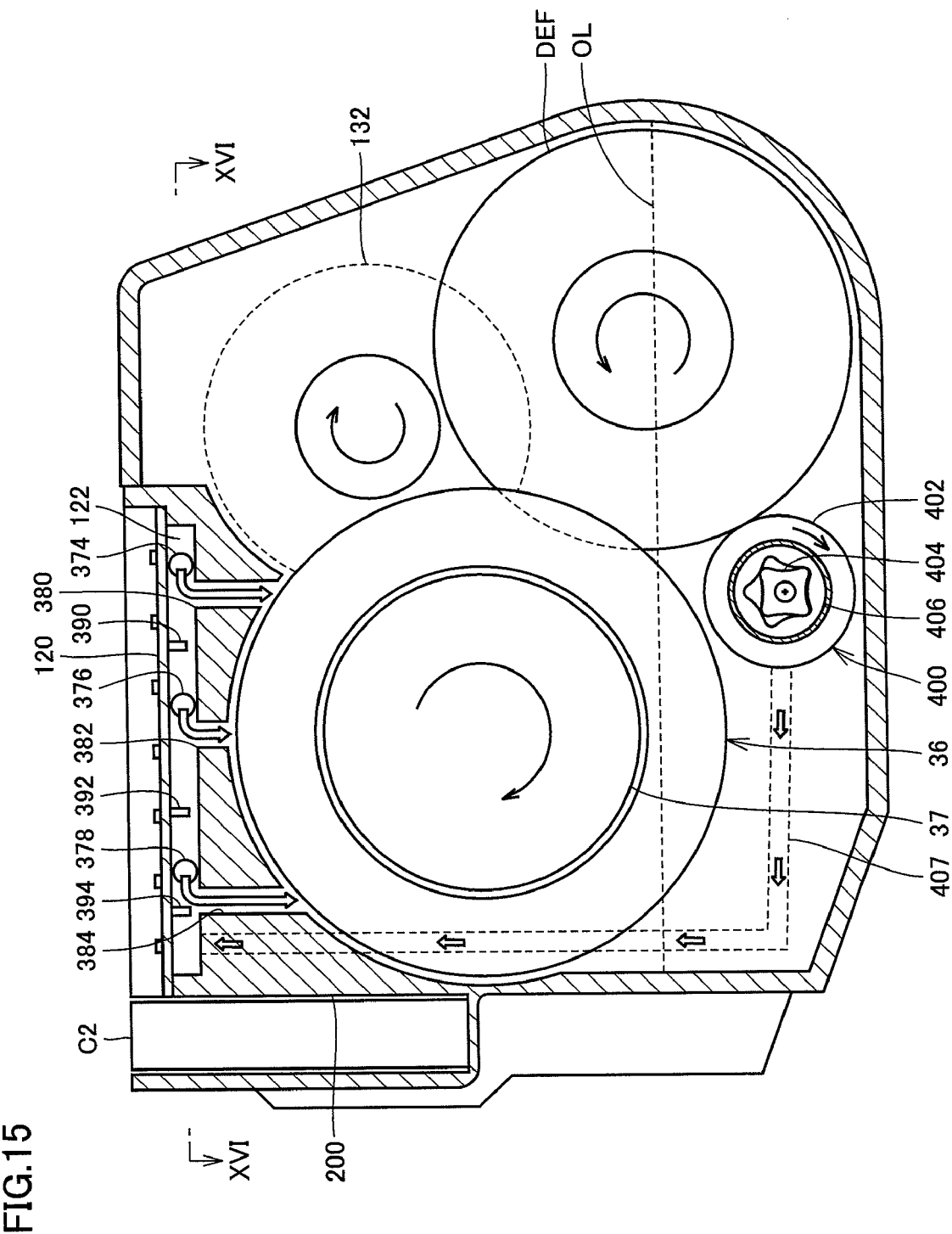
FIG. 15 shows a third example of oil circulation path 340 in FIG. 9.

FIG. 15 shows a third example of oil circulation path 340 in FIG. 9.

Figure 16:
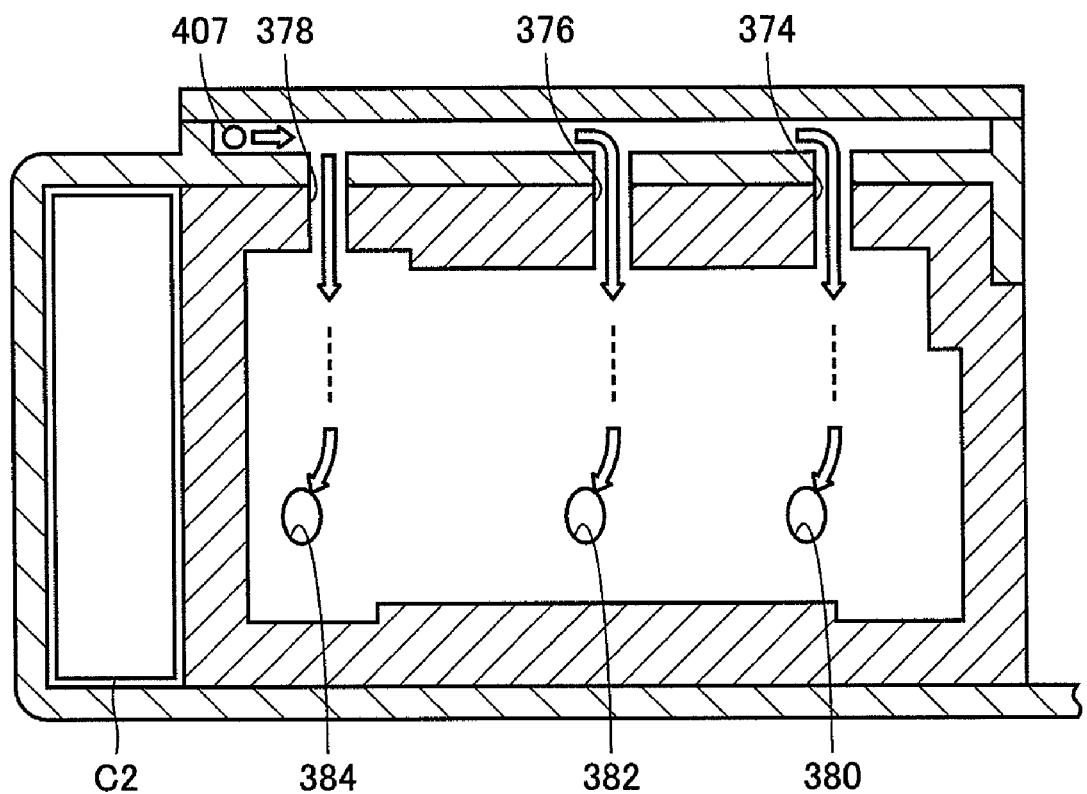
FIG. 16 is a cross section taken along line XVI-XVI in FIG. 15.

FIG. 16 is a cross section taken along line XVI-XVI in FIG. 15.

Referring to FIGS. 15 and 16, this third example of the oil circulation path employs a trochoid oil pump 400, which draws up the lubricating oil from the oil reservoir at the bottom of the casing, and feeds it to an oil passage 407. An outlet of oil passage 407 is located upstream to the power control unit including board 120 in the lubrication path of the lubricating oil.

Oil pump 400 includes a drive gear 402 meshing with differential gear DEF, an inner rotor 404 having a shaft coupled to drive gear 402 for rotation together with it, and an outer rotor 406 having inner teeth meshing with inner rotor 404.

An output let of oil passage 407 is communicated with oil inlets 374, 376 and 378 as shown in FIG. 16, and fins 390, 392 and 394 arranged on the bottom of board 120 release the heat to the lubricating oil. Then, the lubricating oil flows through oil outlets 380, 382 and 384 onto the upper portion of stator 36, and returns through the outer wall of stator 36 to the oil reservoir at the bottom of the casing.

In the modification shown in FIGS. 15 and 16, oil pump 400 corresponds to the "mechanism drawing up the lubricating oil from the oil pan according to the rotation of the rotating electric machine and feeding the lubricating oil to a portion of the lubrication path upstream to the power control unit" in the "circulating mechanism of the lubricating oil", and oil passages 407 and 122 correspond to a part of the "circulation path of the lubricating oil".

The modification shown in FIGS. 15 and 16 can achieve substantially the same effect as the example shown in FIGS. 11 and 12.

According to this embodiment, as described above, it is not necessary to arrange water-cooling between the motor and the inverter in contrast to the conventional structure so that the sizes and required space can be reduced. Further, the substantially vertical size of the device mounted on the vehicle can be reduced, and therefore the center of mass can be lowered.

The embodiments have been described in connection with the example not employing the water-cooling system of the power control unit. However, an oil-cooling system may be employed as a part of the cooling system of the power control unit, and thereby the water-cooling system may be simplified and reduced in size. The embodiment has been described in connection with the example in which the invention is applied to the hybrid vehicle. However, the invention is not restricted to this structure, and may be applied to electric cars, fuel-cell cars and the like.

Although the present invention has been described and illustrated in detail, it is clearly understood that the same is by way of illustration and example only and is not to be taken by way of limitation, the scope of the present invention being interpreted by the terms of the appended claims.

The invention claimed is:

1. A drive device of a vehicle comprising:
   a first rotating electric machine;
   a circulating mechanism for lubricating oil lubricating and cooling said first rotating electric machine;
   a power control unit controlling said first rotating electric machine and cooled by heat exchange with said lubricating oil; and
   a casing accommodating said first rotating electric machine, said circulating mechanism and said power control unit, and provided with a circulation path of said lubricating oil,
   wherein:
   said vehicle includes an internal combustion engine used together with said first rotating electric machine for rotating a wheel,
   said casing is in contact with said internal combustion engine in a thermally conductive fashion,
   a heat of said lubricating oil is transmitted to a housing of said internal combustion engine through said casing,
   said housing of said internal combustion engine is provided with a water passage circulating cooling water, and
   said casing has a radiator projection projected into said water passage.

2. The drive device of the vehicle according to claim 1, wherein
   said casing includes an oil pan arranged in a downstream portion of said circulation path, and
   said circulating mechanism includes a mechanism drawing said lubricating oil from said oil pan according to the rotation of said rotating electric machine and feeding the lubricating oil to a portion of said lubrication path upstream to said power control unit.

3. The drive device of the vehicle according to claim 1, wherein:
   said power control unit includes:
   a power control element, and
   a board having a first main surface on which said power control element is mounted; and
   said board has a radiator projection arranged on a second main surface side of said board for contact with said lubricating oil in said circulation path.

4. A drive device of a vehicle comprising:
   a first rotating electric machine;
   a circulating mechanism for lubricating oil lubricating and cooling said first rotating electric machine;
   a power control unit controlling said first rotating electric machine and cooled by heat exchange with said lubricating oil; and
   a casing accommodating said first rotating electric machine, said circulating mechanism and said power control unit, and provided with a circulation path,
   wherein
   said vehicle includes an internal combustion engine;
   said drive device of the vehicle further comprises:
   a second rotating electric machine including a rotor having a rotation axis coaxial with a rotation axis of a rotor of said first rotating electric machine; and
   a power splitting mechanism arranged coaxially with a rotation axis of a crank shaft of said internal combustion engine and between said first and second rotating electric machines, and having a first shaft receiving a rotation of the rotor of said first rotating electric machine, a second shaft receiving a rotation of the rotor of said second rotating electric machine and a third shaft receiving a rotation of said crank shaft;

said power control unit controls said first and second rotating electric machines; and said casing further accommodates said second rotating electric machine and said power splitting mechanism.

5. The drive device of the vehicle according to claim 4, wherein said power control unit includes:

first and second inverters arranged corresponding to said first and second rotating electric machines, respectively, and a voltage converter arranged commonly to said first and second inverters; and said voltage converter includes a reactor and a capacitor arranged in a divided fashion and located on the opposite sides, respectively, of one of said first and second rotating electric machine and said power splitting mechanism.

6. The drive device of the vehicle according to claim 4, wherein said casing includes:

a first accommodation chamber provided with a first opening and accommodating said power control unit, a second accommodation chamber provided with a second opening and accommodating said second rotating electric machine, and a partition separating the first and second accommodating chambers from each other; and said partition is provided with a hole forming a part of said circulation path.

* * * * *